UNITED STATES PATENT OFFICE.

HENRY J. BOWERFIND, OF FORT WAYNE, INDIANA.

COMPOSITION OF MATTER FOR NERVE-CANALS IN TEETH.

No. 908,942. Specification of Letters Patent. Patented Jan. 5, 1909.

Application filed July 10, 1908. Serial No. 442,903.

*To all whom it may concern:*

Be it known that I, HENRY J. BOWERFIND, a citizen of the United States, residing at Fort Wayne, in the county of Allen, in the State of Indiana, have invented certain new and useful Improvements in Compositions of Matter for Nerve-Canals in Teeth; and I do hereby declare that the following is a full, clear, and exact description of the invention, which will enable others skilled in the art to which it appertains to make and use the same.

My invention relates to an improvement in compositions of matter for the treatment of abscessed teeth and for the filling of nerve canals in teeth.

The object of my present invention is to provide an improved composition which is adapted for the treatment of abscessed teeth, and also serves as a permanent root canal filling in teeth, and when so employed liberates oxygen. It is a well known fact that oxygen possesses the property of decomposing dead organic matter by virtue of its oxidizing power. These qualities naturally possessed by oxygen makes it particularly valuable and useful as an antiseptic and germicidal agent when employed as a tooth abscess remedy or as a permanent root canal filling in teeth.

My present invention is based on the known fact that peroxids of the alkalies and alkaline earths when brought in contact with acids, and sometimes even in contact with moisture, undergo decomposition resulting in formation of oxygen, water and a basic salt, and consists in the combination with the hereafter described materials or any similar of known antiseptic germicidal or detergent properties, one or a combination of any of the peroxids, perborates or percarbonates of zinc, sodium, potassium, ammonium, calcium or magnesium, all of which I have found by experiments can be employed, and of which I have chosen the zinc peroxid as the most suitable, on account of the volume of oxygen furnished. This composition of matter is formed of two separate compositions, one a liquid and the other a powder, which are maintained in a separate state until they are desired for immediate use by the dentist, at which time they are united by him for use in substantially the proportions hereinafter stated, and serve as a convenient, reliable and efficient remedy for the treatment of abscessed teeth, and as a permanent root canal filling.

I have found my invention gives prompt and satisfactory results when compounded substantially as follows:

The powder or first composition consisting of—

Zinc peroxid _____ ten per cent.
Zinc oxid _____ ninety per cent.

The liquid or second composition consisting of—

Beechwood creosote_sixty per cent.
Formalin _____ twenty per cent.
Alcohol _____ ten per cent.
Citric acid _____ ten per cent.

Each of these compositions is usually and preferably put up in one half ounce separate bottles. The above stated proportions of ingredients may be altered or varied and other ingredients added to or substituted for those mentioned and described.

In the specification I have employed the term zinc peroxid, and therefore in defining the invention in the claims, I desire it understood that by the employment of such an expression the same is intended to include equivalent substances, and is not to be limited to the specific material stated in the claims.

It is obvious that that part of my remedy for abscessed teeth and permanent root canal filling as heretofore mentioned as powder or first composition, may be compressed into tablet form if desired.

To use my invention these two compositions are mixed together to the proper consistency. When it is desired to use my invention for the treatment of abscessed teeth, a proper quantity of the above described powder and liquid compositions are properly mixed together until they have a consistency substantially equal to that of thick cream, after which the mixture is placed in the tooth canals, where its oxidizing and antiseptic properties are liberated and produce their healing functions. The mixture, after a suitable time, is then removed and the root canal is permanently filled with the same mixture after its consistency has been increased to substantially that of butter by the addition of a greater proportion of the powder composition. The mixture when prepared in this manner and in position in the tooth cavity gradually hardens and forms an ideal permanent cement filling for the root canal, which is not affected by the action of the secretions of the mouth. After my invention has been employed as above described, the operator proceeds in the usual manner with the proper crowning, filling or capping of the tooth thus treated.

Having thus described my invention and the manner of employing the same what I desire to secure by Letters Patent is:

1. A composition of matter for the purpose specified, consisting of an antiseptic liquid, and an oxidizing powder containing zinc peroxid, which when brought into contact with the said liquid forms an oxidizing agent due to the liberation of oxygen by such union, and which also forms a permanent root canal filling for the teeth.

2. A composition of matter comprising an antiseptic liquid and an oxidizing powder containing zinc peroxid, the union of these ingredients being adapted to result in the liberation of oxygen in the tooth cavity, and also to form a hardened and permanent tooth filling.

3. A composition of matter for the treatment and permanent filling of nerve canals of diseased teeth, consisting of a liquid having the specified ingredients in the proportions stated, and a powder formed of zinc oxid and zinc peroxid in the proportions specified, as and for the purposes described.

Signed by me at Fort Wayne, Allen county, State of Indiana, this 9th day of July, 1908.

HENRY J. BOWERFIND.

Witnesses:
 WATTS P. DENNY,
 AUGUSTA VIBERG.